US010832578B2

(12) United States Patent
Baek

(10) Patent No.: US 10,832,578 B2
(45) Date of Patent: *Nov. 10, 2020

(54) SYSTEM AND METHOD FOR COLLISION PREVENTION

(71) Applicant: MANDO CORPORATION, Pyeongtaek-si (KR)

(72) Inventor: Hyun Woo Baek, Seongnam-si (KR)

(73) Assignee: MANDO CORPORATION, Pyeongtaek-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/213,541

(22) Filed: Dec. 7, 2018

(65) Prior Publication Data

US 2019/0108754 A1  Apr. 11, 2019

Related U.S. Application Data

(63) Continuation of application No. 15/908,337, filed on Feb. 28, 2018.

(30) Foreign Application Priority Data

Feb. 28, 2017 (KR) .......................... 10-2017-0026543

(51) Int. Cl.
*G08G 1/16* (2006.01)
*B60W 30/095* (2012.01)
(Continued)

(52) U.S. Cl.
CPC .............. *G08G 1/166* (2013.01); *B60W 30/09* (2013.01); *B60W 30/095* (2013.01);
(Continued)

(58) Field of Classification Search
CPC ........... B60T 2201/08; B60T 2201/081; B60T 2201/082; B60T 2201/089; B60W 30/09;
(Continued)

(56) References Cited

U.S. PATENT DOCUMENTS 6,163,750 A * 12/2000 Nojima .............. G01C 21/3629
340/988
7,493,200 B2 * 2/2009 Takahashi ................. B60T 7/22
180/167
(Continued)

FOREIGN PATENT DOCUMENTS

CN  103153744 A  6/2013
CN  104118431 A  10/2014
(Continued)

OTHER PUBLICATIONS

Office Action dated Jul. 1, 2020 in Chinese Patent Application No. 201810169061.9.

*Primary Examiner* — Donald J Wallace
(74) *Attorney, Agent, or Firm* — Morgan, Lewis & Bockius LLP

(57) ABSTRACT

A system for collision prevention of a host vehicle includes a camera sensor and/or a radar sensor mounted to the host vehicle and having a field of view outside of the host vehicle. A controller communicatively connected to the camera or radar sensor is configured to determine a first lateral distance between a preceding vehicle running in a same direction as the host vehicle and one of a roadway center line or an oncoming vehicle located in the opposite lane with respect to the host vehicle. The controller compares the first lateral distance to a second lateral distance to determine a danger of collision, and controls a danger warning device to generating a warning signal according to a result of the comparison. A method for collision prevention is also provided.

22 Claims, 13 Drawing Sheets

(51) Int. Cl.
*B60W 30/18* (2012.01)
*B60W 30/09* (2012.01)

(52) U.S. Cl.
CPC .... *B60W 30/0953* (2013.01); *B60W 30/0956* (2013.01); *B60W 30/18154* (2013.01)

(58) Field of Classification Search
CPC .. B60W 30/095; G08G 1/166; G06K 9/00798
See application file for complete search history.

(56) References Cited

U.S. PATENT DOCUMENTS

| | | | | |
|---|---|---|---|---|
| 7,765,066 | B2 * | 7/2010 | Braeuchle | B60W 30/095 |
| | | | | 382/103 |
| 9,493,163 | B2 | 11/2016 | Ezoe et al. | |
| 9,849,837 | B2 * | 12/2017 | Han | B60R 1/00 |
| 10,037,472 | B1 | 7/2018 | Chen et al. | |
| 2004/0193351 | A1 * | 9/2004 | Takahashi | B60T 7/22 |
| | | | | 701/70 |
| 2005/0228588 | A1 * | 10/2005 | Braeuchle | B60W 30/095 |
| | | | | 701/301 |
| 2008/0291276 | A1 * | 11/2008 | Randler | B62D 1/28 |
| | | | | 348/149 |
| 2016/0339914 | A1 | 11/2016 | Habu et al. | |
| 2017/0166127 | A1 * | 6/2017 | Han | B60R 1/00 |
| 2018/0162392 | A1 * | 6/2018 | Takaki | G01S 13/93 |

FOREIGN PATENT DOCUMENTS

| | | |
|---|---|---|
| CN | 105584487 A | 5/2016 |
| CN | 106056972 A | 10/2016 |
| JP | 2013-180638 A | 9/2013 |
| JP | 2015041222 A | 3/2015 |
| KR | 10-2002-0015135 A | 2/2002 |
| KR | 10-1826628 B1 | 2/2018 |

* cited by examiner

SYSTEM AND METHOD FOR COLLISION PREVENTION

CROSS-REFERENCE TO RELATED APPLICATION

This application is a continuation of U.S. application Ser. No. 15/908,337, filed on Feb. 28, 2018 in the U.S. Patent and Trademark Office, which claims priority to and the benefit of Korean Patent Application No. 10-2017-0026543, filed on Feb. 28, 2017, the disclosures of which are incorporated herein by reference in their entireties.

BACKGROUND

1. Field

Exemplary embodiments relates to a vehicle system, and more particularly, to a system and method for collision prevention.

2. Discussion of Related Art

Generally, a vehicle operating system may refer to a system related to operation of a vehicle (e.g., running of a vehicle, etc.) and may include a collision prevention system.

Such a collision prevention system may refer to a system for preventing collision between a host vehicle and other vehicles. Particularly, in recent years, there is a need to study a Cross Traffic Assistance (CTA) system among such collision prevention systems.

SUMMARY

Exemplary embodiments may provide a collision prevention system and method capable of giving a warning about a danger of a collision with a vehicle running in the opposite direction, that is, an oncoming vehicle located in the opposite lane and performing braking and/or steering control when a host vehicle enters and passes through an intersection.

Also, exemplary embodiments may provide an intersection collision prevention system and method capable of giving a warning about a danger of a collision with a preceding vehicle running in the same direction and performing braking and/or steering control when a host vehicle enters and passes through an intersection.

According to an aspect of the disclosure, a collision prevention system of a host vehicle includes at least one of a camera sensor or a radar sensor mounted to the host vehicle and having a field of view outside of the host vehicle; and a controller communicatively connected to the at least one of the camera sensor or the radar sensor. The controller is configured to perform functions to determine a first lateral distance between a preceding vehicle running in a same direction as the host vehicle and one of a roadway center line or an oncoming vehicle located in an opposite lane with respect to the host vehicle; compare the first lateral distance to a predetermined second lateral distance to determine a danger of collision; and control a danger warning device to generate a warning signal according to a result of the comparison.

The at least one of the camera sensor or the radar sensor may be configured to sense areas around the host vehicle and generate image data or radar sensing data, and the controller may determine the first lateral distance between the preceding vehicle and the one of the roadway center line or the oncoming vehicle on the basis of the image data or the radar sensing data.

The controller may recognize a lane disconnection or at least one of a "go straight" or "turn left" indication from the image data and determines whether the host vehicle enters an intersection.

The controller may generate a predicted route for the host vehicle on the basis of a lane in which the host vehicle is to run after passing through the intersection, and determine the first lateral distance on the basis of a lateral distance between the predicted route and one of the oncoming vehicle or the roadway center line and a lateral distance between the predicted route and the preceding vehicle.

When the controller determines that there is a danger of collision, the controller may control a braking controller of the host vehicle to generate a brake force according to the result of the comparison.

When the controller determines that the first lateral distance is greater than the second lateral distance, the controller may control a steering controller so that a center position of the host vehicle is to pass through a center of the first lateral distance.

The controller may determine the danger of collision by using a width of the host vehicle, a center position in the host vehicle, a width of the oncoming vehicle, a center position in the oncoming vehicle, a width of the preceding vehicle, and a center position in the preceding vehicle.

The controller may determine the danger of collision by using a width of the host vehicle, a center position in the host vehicle, the roadway center line, a width of the preceding vehicle, and a center position in the preceding vehicle.

According to another aspect of the disclosure, a collision prevention method includes determining, based on sensing data captured by a sensor mounted to a host vehicle, a first lateral distance between a preceding vehicle running in a same direction as the host vehicle and one of a roadway center line or an oncoming vehicle located in an opposite lane with respect to the host vehicle; comparing, in a processor coupled to the sensor mounted to the host vehicle, the first lateral distance to a predetermined second lateral distance to determine a danger of collision; and controlling a danger warning device communicatively connected to the processor to generate a warning signal according to a result of the comparison.

The method may further include, before the determining of the first lateral distance, at least one of: capturing, by a camera sensor mounted to the host vehicle, images of areas around the host vehicle and generating image data; or sensing, by a radar sensor mounted to the host vehicle, the areas around the host vehicle and generating radar sensing data. The determining the first lateral distance may include determining the first lateral distance between the preceding vehicle and the one of the oncoming vehicle or the roadway center line on the basis of at least one of the image data or the radar sensing data.

The determining the first lateral distance may include recognizing a lane disconnection or at least one of a "go straight" or "turn left" indication from the image data; determining whether the host vehicle enters an intersection; and determining the first lateral distance in response to determining that the host vehicle enters the intersection.

In response to determining that the host vehicle enters the intersection, the determining the first lateral distance may include generating a predicted route for the host vehicle on the basis of a lane in which the host vehicle is to run after passing through the intersection; and determining the first lateral distance on the basis of a lateral distance between the predicted route and the one of the oncoming vehicle or the roadway center line and a lateral distance between the predicted route and the preceding vehicle.

Before the controlling the danger warning device to generate the warning signal, the method may further include controlling a braking controller to apply brakes of the host vehicle in response to determining the danger of collision.

Before the controlling the danger warning device to generate the warning signal, the method may further include controlling a steering controller to steer the host vehicle so that a center position of the host vehicle is directed to pass through a center of the first lateral distance in response to determining that the first lateral distance is greater than the predetermined second lateral distance.

The determining the first lateral distance may include calculating the first lateral distance by using a width of the host vehicle, a center position in the host vehicle, a width of the oncoming vehicle, a center position in the oncoming vehicle, a width of the preceding vehicle, and a center position in the preceding vehicle.

The determining the first lateral distance may include determining the first lateral distance by using a width of the host vehicle, a center position in the host vehicle, the roadway center line, a width of the preceding vehicle, and a center position in the preceding vehicle.

In accordance with another aspect of the disclosure, a collision prevention method for a host vehicle includes sensing, using at least one of a camera sensor or a radar sensor mounted to the host vehicle, an area around the host vehicle to generate image data or radar sensing data; determining, by a processor communicatively connected to the at least one of the camera sensor or the radar sensor, based on the image data or radar sensing data, a first distance orthogonal to a route of the host vehicle and between a preceding vehicle running in a same direction as the host vehicle and one of a roadway center line or an oncoming vehicle located in an opposite lane with respect to the host vehicle; and selectively controlling, by the processor, at least one of a braking controller or a steering controller of the host vehicle based on the result of the determined first distance.

The collision prevention method may further include, before the determining of the first distance, at least one of: capturing, by a camera sensor mounted to the host vehicle, images of areas around the host vehicle and generating image data; or sensing, by a radar sensor mounted to the host vehicle, the areas around the host vehicle and generating radar sensing data, where the determining the first distance comprises determining the first distance between the preceding vehicle and the one of the oncoming vehicle or the roadway center line on the basis of at least one of the image data or the radar sensing data.

The processor may selectively activate the braking controller to apply brakes of the host vehicle in response to determining that the first distance is less than a predetermined second distance.

The processor may selectively activate the steering controller to steer the host vehicle through a center of a first space between the preceding vehicle and the roadway center line.

The collision prevention method may further include determining a predicted route of the host vehicle through an intersection, where the first distance is determined based on the determined predicted route.

The processor may determine the predicted route of the host vehicle on the basis of a current lane of the host vehicle and a lane in which the host vehicle is to run after passing through the intersection.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
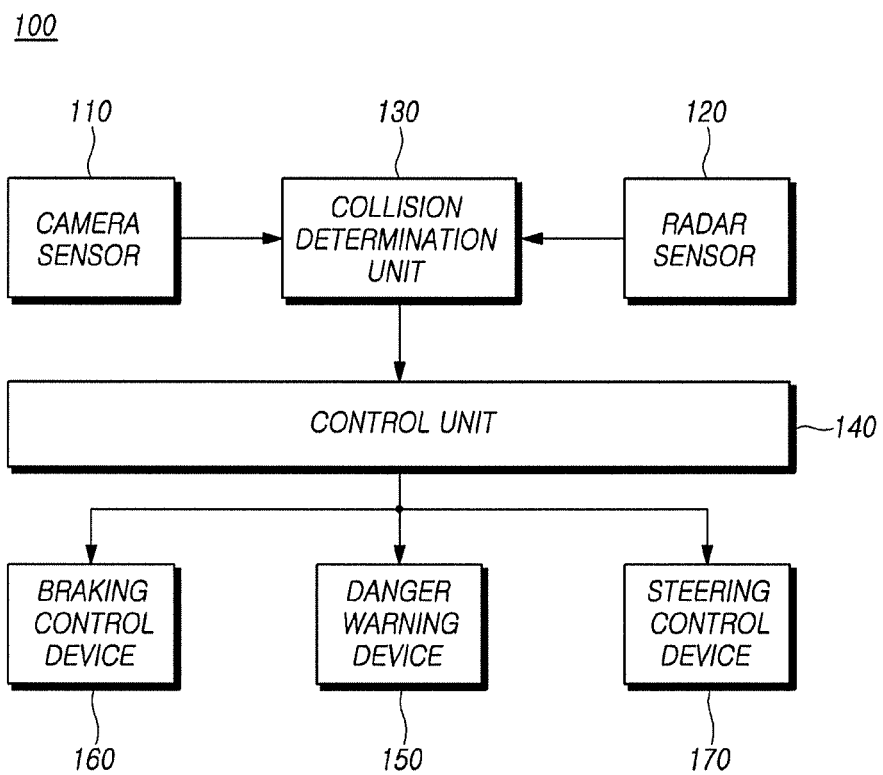
FIG. 1 is a block diagram illustrating an intersection collision prevention system according to exemplary embodiments.

Hereinafter, exemplary embodiments will be described in detail with reference to the accompanying drawings so that they can be easily practiced by those skilled in the art. The exemplary embodiments may, however, be embodied in many different forms and should not be construed as being limited to the embodiments set forth herein.

To clearly describe exemplary embodiments, portions irrelevant to the description are omitted, and the same or similar elements are denoted by the same reference numerals.

Throughout the specification, when one part is referred to as being "connected" to another part, it should be understood that the former can be "directly connected" to the latter or "electrically connected" to the latter via an intervening part. Furthermore, when a part is referred to as "including" elements, it should be understood that it can include only those elements, or other elements as well as those elements unless specifically described otherwise.

It will be understood that when one part is referred to as being "on" another part, it can be directly on another part or intervening parts may be present therebetween. In contrast, when a part is referred to as being "directly on" another part, there are no intervening parts therebetween.

It will be understood that, although the terms first, second, third, etc. may be used herein to describe various parts, components, regions, layers and/or sections, but are not limited thereto. These teams are only used to distinguish one part, component, region, layer, or section from another part, component, region, layer or section. Thus, a first part, component, region, layer, or section discussed below could be termed a second part, component, region, layer, or section without departing from the scope of the embodiments.

The technical terms used herein are to simply mention a particular exemplary embodiment and are not meant to limit the exemplary embodiments. An expression used in the singular encompasses the expression of the plural, unless it has a clearly different meaning in the context. In the specification, it is to be understood that the terms such as "including" or "having" etc., are intended to indicate the existence of specific features, regions, integers, steps, operations, elements, and/or components, and are not intended to preclude the possibility that one or more other specific features, regions, integers, steps, operations, elements, components, or combinations thereof may exist or may be added.

Spatially relative terms, such as "below," "above," and the like, may be used herein for ease of description to describe one part's positional relationship to other part(s) in the orientation illustrated in the figures. It will be understood that the spatially relative terms are intended to encompass different orientations of a device in use in addition to the orientations depicted in the drawings. For example, if the device in the figures is turned over, parts described as "below" other parts would then be oriented "above" the other parts. Thus, the exemplary term "below" can encompass both an orientation of above and below. Devices may be otherwise rotated 90 degrees or by other angles and the spatially relative descriptors used herein are interpreted accordingly.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have idealized or excessively formal meanings unless clearly defined in the present application.

Hereinafter, exemplary embodiments will be described in detail with reference to the accompanying drawings so that they can be easily practiced by those skilled in the art. The exemplary embodiments may, however, be embodied in many different forms and should not be construed as being limited to the embodiments set forth herein.

FIG. 1 is a block diagram illustrating an intersection collision prevention system according to exemplary embodiments.

Referring to FIG. 1, an intersection collision prevention system 100 according to exemplary embodiments may include a camera sensor 110, a radar sensor 120, a collision determination unit 130, a control unit 140, a danger warning device 150, a braking control device 160, and a steering control device 170.

The camera sensor 110 may include at least one of a lens, a lens holder, an image sensor, an image processor, and a camera microcontroller unit (MCU), and the image processor receives image data from the image sensor. To this end, the image processor and the image sensor may be connected to each other through a connector. The camera MCU may receive image data processed by the image processor and may transmit the received image data to the collision determination unit 130. Here, the camera sensor 110 may include a mono camera, a stereo camera, or a surround vision camera and may have a field of view extending to as to capture at least one area around a host vehicle such as one or more of areas in front of, behind, and to the left/right of the host vehicle to generate image data.

The radar sensor 120 may include at least one of a radar module and a radar MCU. Here, the radar module and the radar MCU may be connected to each other and configured to transmit and receive data. The radar sensor 120 may be a sensor device that uses electromagnetic waves to measure distance, speed, and angle of an object. The radar sensor 120 may detect objects within a horizontal angle range of 30 degrees and a distance of up to 150 meters ahead by using at least one of Frequency Modulated Carrier Wave (FMCW) and Pulse Carrier. The radar MCU may control other devices (e.g., a radar processor for processing a radar sensing output) of the host vehicle connected to the radar module. The control may include at least one of, for example, power supply control, reset control, clock (CLK) control, data communication control, and memory control. Representatively, the radar sensor 120 may use 77 GHz frequency band or other suitable bands to have a field of view extending so as to sense at least one area around the host vehicle such as one or more of areas in front of, behind, and to the left/right of the host vehicle and to generate radar sensing data on the basis of the sensed result. The radar sensing data of the radar sensor 120 may be transmitted to the collision determination unit 130. Meanwhile, the radar processor may process the radar sensing data output by the radar sensor 120 and output the processed data to the processor 130, and the processing may include enlarging an object sensed ahead or focusing on an area of an object among the overall viewing area.

Figure 2:
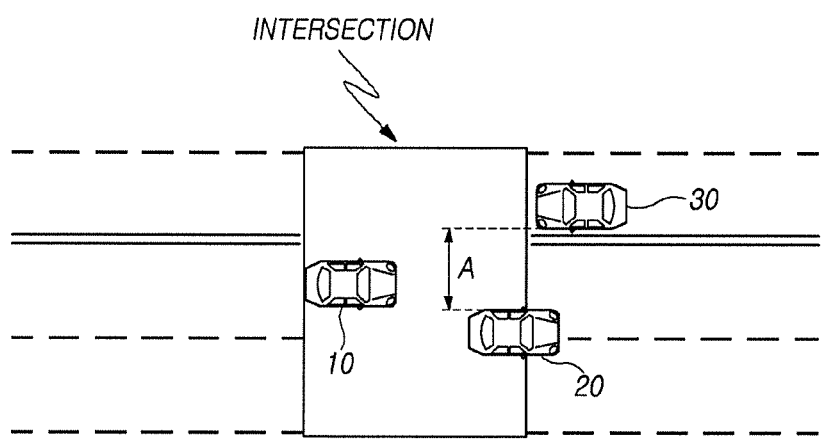
FIG. 2 illustrates a method of determining a danger of a collision when a host vehicle is entering and passing through an intersection by means of an intersection collision prevention system according to exemplary embodiments.

FIG. 2 illustrates a method of determining a danger of a collision when a host vehicle is entering and passing through an intersection by means of an intersection collision prevention system according to exemplary embodiments.

Referring to FIGS. 1 and 2, the collision determination unit 130 according to exemplary embodiments may determine a danger of a collision between a host vehicle 10 and a preceding vehicle 20 travelling in the same running direction as each other. For example, when the host vehicle 10 enters and passes through an intersection, the collision determination unit 130 may determine a danger of a collision between the host vehicle 10 and the preceding vehicle 20 running in the same direction as that of the host vehicle 10.

Also, the collision determination unit 130 may determine a danger of a collision between the host vehicle 10 and vehicles travelling in the opposite direction (including a moving vehicle and a stationary vehicle) such as an oncoming vehicle 30 located in the opposite lane with respect to the lane of travel of the host vehicle 10 (e.g., a lane designated for travel in a direction opposite to the direction of travel of the host vehicle's lane). For example, when the host vehicle 10 enters and passes through an intersection, the collision determination unit 130 may determine a danger of a collision between the host vehicle 10 and the vehicles travelling in the opposite direction (including a moving vehicle and a stationary vehicle) such as the oncoming vehicle 30 located in the opposite lane with respect to the host vehicle 10.

Here, the collision determination unit 130 may determine whether the host vehicle 10 enters an intersection by using information received from the camera sensor 110 (a lane disconnection, a "go straight"/"turn left" indication, or the like). That is, the collision determination unit 130 may receive image data from the camera sensor 110 and may recognize at least one of a lane disconnection and a "go straight"/"turn left" indication from the image data received from the camera sensor 110 to determine whether the host vehicle enters an intersection.

While the host vehicle 10 enters and passes through an intersection, a collision may occur when the preceding vehicle 20 running in the same direction as the host vehicle 10 and a vehicle running in the opposite direction such as the oncoming vehicle 30 located in the opposite lane with respect to the host vehicle 10 have a small space therebetween. In order to prevent such a danger of a collision, the collision determination unit 130 may calculate a first space A between the preceding vehicle 20 running in the same direction as the host vehicle 10 and the vehicle running in the opposite direction such as the oncoming vehicle 30 located in the opposite lane with respect to the host vehicle 10. Here, the collision determination unit 130 detects a roadway center line (e.g., a yellow center line) to detect the oncoming vehicle 30 located in the opposite lane with respect to the host vehicle 10.

The collision determination unit 130 may calculate a first space A between the yellow center line and the preceding vehicle 20 running in the same direction as the host vehicle 10.

That is, the collision determination unit 130 may calculate a first space A between the preceding vehicle 20 running in the same direction as the host vehicle 10 and at least one of the yellow center line and the oncoming vehicle 30 located in the opposite lane with respect to the host vehicle 10.

Figure 3:
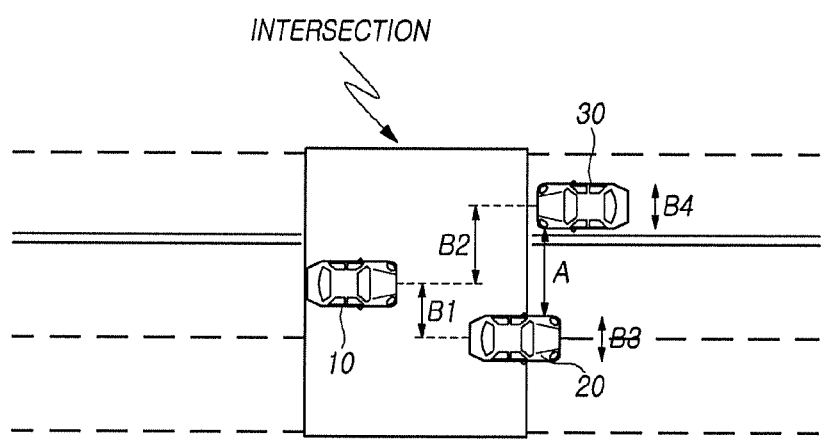
FIG. 3 illustrates a method of calculating a first space through an intersection collision prevention system according to exemplary embodiments.

FIG. 3 illustrates a method of calculating a first space A through an intersection collision prevention system according to exemplary embodiments.

Referring to FIGS. 1 to 3, the intersection collision prevention system according to exemplary embodiments may calculate a first space A (or first lateral distance) between the preceding vehicle 20 running in the same direction as the host vehicle 10 and at least one of the yellow center line and the oncoming vehicle 30 located in the opposite lane with respect to the host vehicle 10 by means of the collision determination unit 130 and may compare the first space A to a predetermined second space (e.g., a second lateral distance) to determine a danger of collision. Also, the intersection collision prevention system according to exemplary embodiments may compare the first space to the predetermined second space to determine a danger of a collision by means of the collision determination unit 130. Also, the intersection collision prevention system according to exemplary embodiments may adjust a collision danger warning time point according to a determination result of the collision determination unit 130 by means of the control unit 140.

As described above, when the host vehicle 10 enters and passes through an intersection, the intersection collision prevention system according to exemplary embodiments calculates a spatial width lateral or orthogonal to a direction in which the host vehicle 10 will travel to determine whether the host vehicle 10 can fit or pass. When the host vehicle 10 cannot fit or pass, the intersection collision prevention system according to exemplary embodiments gives a warning and/or controls the vehicle to prevent a collision.

The intersection collision prevention system according to exemplary embodiments will be described below in detail.

Referring to FIGS. 1 to 3 again, the collision determination unit 130 may calculate a first space A between the preceding vehicle 20 running in the same direction as the host vehicle 10 and the vehicle running in the opposite direction, that is, the oncoming vehicle 30 located in the opposite lane with respect to the host vehicle 10 and may compare the first space A to a reference value (a second space) to determine a danger of a collision. Here, the reference value may be used to calculate a warning time point from a time to collision (TTC) map based on speed of the host vehicle 10.

That is, the collision determination unit 130 may calculate a first space A between the preceding vehicle 20 running in the same direction as the host vehicle 10 and the vehicle running in the opposite direction, that is, the oncoming vehicle 30 located in the opposite lane with respect to the host vehicle 10 on the basis of at least one of image data received from the camera sensor 110 and radar sensing data received from the radar sensor 120 and may compare the first space A to the reference value (the second space) to determine the danger of a collision.

In particular, the collision determination unit 130 may determine the danger of a collision by using at least one of a width of the host vehicle 10, a center position of the host vehicle 10, a current location of the host vehicle 10, a width of the oncoming vehicle 30, a center position in the oncoming vehicle 30, a current location of the oncoming vehicle 30, a width of the preceding vehicle 20, a center position in the preceding vehicle 20, and a current location of the preceding vehicle 20. As an example, the collision determination unit 130 may calculate a first space A by determining a distance from a predetermined position in the host vehicle 10 to one side of the oncoming vehicle 30 (e.g., a side of the oncoming vehicle 30 closest to the host vehicle 10) and a distance from a predetermined position in the host vehicle 10 to one side of the preceding vehicle 20 (e.g., a side of the preceding vehicle 20 closest to the host vehicle 10). Here, the one side of the oncoming vehicle 30 and the one side of the preceding vehicle 20 may be left sides with respect to their respective running directions, and may correspond to the sides of the oncoming vehicle 130 and preceding vehicle 20 closest to the host vehicle 10. However, the exemplary embodiments are not limited thereto, and the one side of the oncoming vehicle 30 and the one side of the preceding vehicle 20 may be sides adjacent to the host vehicle 10 with respect to their respective running directions. Here, the predetermined position in the host vehicle 10 may be the center position in the host vehicle 10. However, the exemplary embodiments are not limited thereto, and the predetermined position may include any position in the host vehicle 10.

As another example, the collision determination unit 130 may calculate a first space A by using the width of the host vehicle 10, the center position in the host vehicle 10, the width of the oncoming vehicle 30, the center position in the oncoming vehicle 30, the width of the preceding vehicle 20, and the center position in the preceding vehicle 20.

That is, the collision determination unit 130 may calculate a first distance B1, e.g. a lateral distance in a direction orthogonal to the direction of travel or the width of the host vehicle 10, between the center of the width of the host vehicle 10 and the center of the width of the preceding vehicle 20 on the basis of at least one of image data received from the camera sensor 110 and radar sensing data received from the radar sensor 120.

Also, the collision determination unit 130 may calculate a second distance B2, e.g. a lateral distance in a direction orthogonal to the direction of travel or the width of the host vehicle 10, between the center of the width of the host vehicle 10 and the center of the width of the vehicle running in the opposite direction, that is, the center of the width of the oncoming vehicle 30 located in the opposite lane with respect to the host vehicle 10 on the basis of at least one of image data received from the camera sensor 110 and radar sensing data received from the radar sensor 120.

Also, the collision determination unit 130 may calculate a third distance B3, which is the width of the preceding vehicle 20, on the basis of at least one of image data received from the camera sensor 110 and radar sensing data received from the radar sensor 120.

Also, the collision determination unit 130 may calculate a fourth distance B4, which is the width of the vehicle running in the opposite direction, that is, the oncoming vehicle 30 located in the opposite lane with respect to the host vehicle 10 on the basis of at least one of image data received from the camera sensor 110 and radar sensing data received from the radar sensor 120.

Subsequently, the collision determination unit 130 may calculate a first space A, e.g. a lateral distance in a direction orthogonal to the direction of travel or the width of the host vehicle 10, between the preceding vehicle 20 running in the same direction as the host vehicle 10 and the vehicle running in the opposite direction, that is, the oncoming vehicle 30 located in the opposite lane with respect to the host vehicle 10, by using Equation 1 below:

$$A=(B1-B3/2)+(B2-B4/2).$$ [Equation 1]

As shown in Equation 1, the collision determination unit 130 may calculate a first value by dividing a third width B3 by two and then subtracting the quotient from a first width B1. Also, the collision determination unit 130 may calculate a second value by dividing a fourth width B4 by two and then subtracting the quotient from a second width B2. Subsequently, the collision determination unit 130 may calculate a first space A between the preceding vehicle 20 running in the same direction as the host vehicle 10 and the vehicle running in the opposite direction, that is, the oncoming vehicle 30 located in the opposite lane with respect to the host vehicle 10, by adding the first value and the second value.

Also, the collision determination unit 130 may compare the first space A to a reference value (a second space) to determine a danger of a collision.

For example, the collision determination unit 130 may compare the first space A to the reference value (the second space) and may determine that there is a danger of a collision when the first space A is less than the reference value (the second space). On the other hand, the collision determination unit 130 may compare the first space A to the reference value (the second space) and may determine that there is no danger of a collision when the first space A is greater than or equal to the reference value (the second space).

When the first space A is greater than the width of the host vehicle 10, the host vehicle 10 can pass with no collision. However, when the host vehicle 10 is actually running or travelling at a non-zero speed, the first space A may need to be much greater than the width of the host vehicle 10 for safety reasons. Accordingly, the reference value may be set to a value greater than the width of the host vehicle 10, and the reference value (the second space) may be set to a value obtained by adding a certain margin a to the width of the host vehicle 10. In this case, the certain margin a may be set to a value of 10 cm to 100 cm. However, the exemplary embodiments are not limited thereto, and the certain margin a may be modified and set.

Still referring to FIGS. 1 to 3, the collision determination unit 130 may calculate a first space A between the yellow center line and the preceding vehicle 20 running in the same direction as the host vehicle 10 and may compare the first space A to a reference value (a second space) to determine a danger of a collision. Here, the reference value may be used to calculate a warning time point from a TTC map based on speed of the host vehicle 10.

That is, the collision determination unit 130 may calculate a first space A between the yellow center line and the preceding vehicle 20 running in the same direction as the host vehicle 10 on the basis of at least one of image data received from the camera sensor 110 and radar sensing data received from the radar sensor 120 and may compare the first space A to the reference value (the second space) to determine a danger of a collision.

In particular, the collision determination unit 130 may determine the danger of a collision by using at least one of the width of the host vehicle 10, the center position in the host vehicle 10, the current location of the host vehicle 10, the yellow center line (e.g., the position of the roadway center line), the width of the preceding vehicle 20, the center position in the preceding vehicle 20, and the current location of the preceding vehicle 20.

As an example, the collision determination unit 130 may calculate a first space A by determining a distance from a predetermined position in the host vehicle 10 to the yellow center line and a distance from a predetermined position in the host vehicle 10 to one side of the preceding vehicle 20. Here, the one side of the preceding vehicle 20 may be a left side with respect to its running or travel direction, as shown in FIGS. 1 to 3. However, the exemplary embodiments are not limited thereto, and the one side of the preceding vehicle 20 may be a side adjacent to (or closest to) the host vehicle 10 with respect to its running direction. Here, the predetermined position in the host vehicle 10 may be the center position in the host vehicle 10. However, the exemplary embodiments are not limited thereto, and the predetermined position may include any position in the host vehicle 10.

As another example, the collision determination unit 130 may calculate a first space A by using the width of the host vehicle 10, the center position in the host vehicle 10, the yellow center line (e.g., the position of the roadway center line), the width of the preceding vehicle 20, and the center position in the preceding vehicle 20.

That is, the collision determination unit 130 may determine a first distance, e.g. a lateral distance in a direction orthogonal to the direction of travel or the width of the host vehicle 10, between the center of the width of the host vehicle 10 and the center of the width of the preceding vehicle 20 on the basis of at least one of image data received from the camera sensor 110 and radar sensing data received from the radar sensor 120.

Also, the collision determination unit 130 may determine a second distance, e.g. a lateral distance in a direction orthogonal to the direction of travel or the width of the host vehicle 10, between the yellow center line and the center of the width of the host vehicle 10 on the basis of at least one of image data received from the camera sensor 110 and radar sensing data received from the radar sensor 120.

Also, the collision determination unit 130 may calculate a third distance, which is the width of the preceding vehicle 20, on the basis of at least one of image data received from the camera sensor 110 and radar sensing data received from the radar sensor 120.

Then, the collision determination unit 130 may calculate a first space by dividing the third distance by two, subtracting the quotient from the first distance, and adding the second distance to the difference.

Also, the collision determination unit 130 may compare the first space to a reference value (a second space) to determine a danger of a collision.

For example, the collision determination unit 130 may compare the first space to the reference value (the second space) and may determine that there is a danger of a collision when the first space is less than the reference value (the second space). On the other hand, the collision determination unit 130 may compare the first space to the reference value (the second space) and may determine that there is no danger of a collision when the first space is greater than or equal to the reference value (the second space).

When the first space is greater than the width of the host vehicle 10, the host vehicle 10 can pass with no collision. However, when the host vehicle 10 is actually running or travelling at non-zero speed, the first space may need to be much greater than the width of the host vehicle 10 for safety reasons. Accordingly, the reference value may be set to a value greater than the width of the host vehicle 10, and the reference value (the second space) may be set to a value obtained by adding a certain margin a to the width of the host vehicle 10. In this case, the certain margin a may be set to a value of 10 cm to 100 cm. However, the exemplary embodiments are not limited thereto, and the certain margin a may be modified and set.

After determining a danger of a collision, the collision determination unit 130 may generate collision determination data and may provide the generated collision determination data to the control unit 140.

The collision determination unit 130 may receive image data from the camera sensor 110 and may recognize at least one of a lane disconnection and a "go straight"/"turn left" indication from the image data received from the camera sensor 110 to determine whether the host vehicle 10 enters an intersection.

Also, when it is determined that the host vehicle 10 enters the intersection, the collision determination unit 130 may calculate a first space through the above-described method and determine a danger of a collision on the basis of the calculated first space.

Also, when it is determined that the host vehicle 10 does not enter the intersection, the collision determination unit 130 may determine a danger of a collision through predetermined collision prevention control. Here, the predetermined collision prevention control may be longitudinal collision prevention control. However, the exemplary embodiments are not limited thereto, and the predetermined collision prevention control may be intersection collision prevention control.

Still referring to FIGS. 1 to 3, the control unit 140 may control operation of at least one of the danger warning device 150, the braking control device 160, and the steering control device 170 on the basis of the provided collision determination data.

For example, the control unit 140 may control operation of the danger warning device 150.

In detail, when the collision determination unit 130 determines that there is a danger of a collision, the control unit 140 may control the danger warning device 150 so that the collision danger warning time point is put earlier than to a reference value. That is, when the collision determination unit 130 determines that there is a danger of a collision because a route along which the host vehicle 10 will pass has a small width, the control unit 140 may control the danger warning device 150 so that the collision danger warning time point is put earlier than the reference value. Here, the warning time point may be calculated from a TTC map based on speed of the host vehicle 10.

On the other hand, when the collision determination unit 130 determines that there is little or no danger of a collision, the control unit 140 may control the danger warning device 150 so that the collision danger warning time point is maintained at the reference value. That is, when the collision determination unit 130 determines that there is little or no danger of a collision because a route along which the host vehicle 10 will pass has a large width, the control unit 140 may control the danger warning device 150 so that the collision danger warning time point is maintained at a default value.

The danger warning device 150 may display the danger of a collision on the basis of a control signal input from the control unit 140. In this case, the collision danger warning time point may be put earlier than the default value when it is determined that there is a danger of a collision, and the collision danger warning time point may be maintained at the default value when it is determined that there is little or no danger of a collision.

The danger warning device 150 may generate a warning signal in at least one of an audio type, a video type, and a haptic type in order to warn a driver of a specific danger situation. For example, in order to output a warning sound, the danger warning device 150 may use a car sound system to output the warning sound. Alternatively, in order to display a warning message, the danger warning device 150 may output the warning message through a head up display (HUD) display or a side mirror display. Alternatively, in order to generate a warning vibration, the danger warning device 150 may operate a vibration motor mounted on a steering wheel.

For example, the control unit 140 may control operation of the braking control device 160.

In detail, when the collision determination unit 130 determines that there is a danger of a collision, the control unit 140 may control the braking control device 160 so that the host vehicle 10 is decelerated.

As an example, when it is determined that there is a danger of a collision because a route along which the host vehicle 10 will pass has a small width, the control unit 140 may control the braking control device 160 so that the host vehicle 10 is decelerated. In this case, in order to avoid the collision, a deceleration rate should be large, and thus the control unit 140 may control the braking control device 160 so that the deceleration rate is greater than an average deceleration rate. Here, the average deceleration rate may be calculated on the basis of the widths of two vehicles (e.g., the host vehicle 10 and the preceding vehicle 20) or the distance between the yellow center line and the preceding vehicle, and the deceleration may be performed according to the average deceleration rate. As another example, the average deceleration rate refers to an average braking force needed to avoid a collision, and the average deceleration rate may be calculated on the basis of an average value between a minimum braking rate and a maximum braking rate that are needed to avoid a collision.

As another example, when it is determined that there is a danger of a collision because a route along which the host vehicle 10 will pass has a small width, the control unit 140 may control the braking control device 160 so that the host vehicle 10 is decelerated. In this case, in order to avoid the collision, a deceleration rate should be large, and thus the control unit 140 may control the braking control device 160 so that the deceleration rate is maximized.

On the other hand, when the collision determination unit 130 determines that there is little or no danger of a collision, the control unit 140 may control the braking control device 160 so that the speed of the host vehicle 10 is maintained at a reference value. That is, when it is determined that there is little or no danger of a collision because a route along which the host vehicle 10 will pass has a sufficiently large width, the control unit 140 may control the braking control device 160 so that the speed of the host vehicle 10 is maintained at the reference value. In this case, the danger of collision is low, and thus the control unit 140 may control the braking control device 160 so that the deceleration rate is smaller than or equal to the average deceleration rate.

The braking control device 160 may control operation of a car brake and may also control pressure of the brake. For example, when a forward collision is probable, the braking control device 160 may perform control so that an emergency brake is automatically operated on the basis of a control signal of the control unit 140, irrespective of whether a driver has operated a brake.

For example, the control unit 140 may control operation of the steering control device 170.

Even when a route along which the host vehicle 10 will pass has a large width, the danger of a collision may increase if the host vehicle 10 is leaned or veers toward one side. Accordingly, in order to reduce the danger of a collision, the control unit 140 may control the steering control device 170 so that the host vehicle 10 passes through the center of the first space A between the preceding vehicle 20 running in the same direction as the host vehicle 10 and the vehicle running in the opposite direction, that is, the oncoming vehicle 30 located in the opposite lane with respect to the host vehicle 10. That is, when the collision determination unit 130 determines that the first space is greater than the second space, the control unit 140 may control the steering control device 170 so that the host vehicle 10 passes through the center of the first space.

The steering control device 170 may control a motor-driven power steering (MDPS) system for operating a steering wheel and/or for turning wheels of the vehicle. For example, when a car collision is probable, the steering control device 170 may control steering of a car to a direction in which the collision can be avoided.

When the host vehicle 10 enters and passes through an intersection, the intersection collision prevention system 100 according to exemplary embodiments may give a warning about a danger of a collision with the vehicle running in the opposite direction, that is, the oncoming vehicle 30 located in the opposite lane with respect to the host vehicle 10 and then may perform braking control. Also, when the host vehicle 10 enters and passes through an intersection, the intersection collision prevention system 100 according to exemplary embodiments may give a warning about a danger of a collision with the preceding vehicle 20 running in the same direction as the host vehicle 10 and then may perform braking control.

When a danger of collision between the host vehicle 10 and the preceding vehicle 20 running in the same direction as the host vehicle 10 is predicted, the intersection collision prevention system 100 according to exemplary embodiments does not calculate the first value and the second value on the basis of Equation 1. The intersection collision prevention system 100 according to exemplary embodiments may detect a danger of a collision, perform steering control, and operate autonomous emergency braking (AEB) when the distance, measured in a direction orthogonal to the direction of travel or the width of the host vehicle 10, between the host vehicle 10 and the preceding vehicle 20 running in the same direction as the host vehicle 10 is smaller than or equal to a certain value. Also, when a danger of a collision between the host vehicle 10 and the vehicle running in the opposite direction, that is, the oncoming vehicle 30 located in the opposite lane with respect to the host vehicle 10 is predicted, the intersection collision prevention system 100 according to exemplary embodiments does not calculate the first value and the second value on the basis of Equation 1. The intersection collision prevention system 100 according to exemplary embodiments may detect a danger of a collision, perform steering control, and operate AEB when a vehicle body of the host vehicle 10 at least partially overlaps a vehicle body of the vehicle running in the opposite direction, that is, the oncoming vehicle 30 located in the opposite lane with respect to the host vehicle 10.

Whether the host vehicle 10 enters an intersection is not necessary when the intersection collision prevention system 100 according to exemplary embodiments gives a warning about a danger of a collision between the host vehicle 10 and the preceding vehicle 20 and performs braking control. A situation in which the host vehicle 10 enters an intersection has been described as an example. Here, whether the host vehicle 10 enters an intersection may be deter fined by using GPS signals or road map information of a navigation in device disposed in the host vehicle 10. The collision prediction method that has been described with reference to FIG. 3 may be applied to predict a danger of a collision between the host vehicle 10 and the vehicle running in the opposite direction, that is, the oncoming vehicle 30 located in the opposite lane with respect to the host vehicle 10 as well as a danger of a collision between the host vehicle 10 and the preceding vehicle 20.

Figure 4:
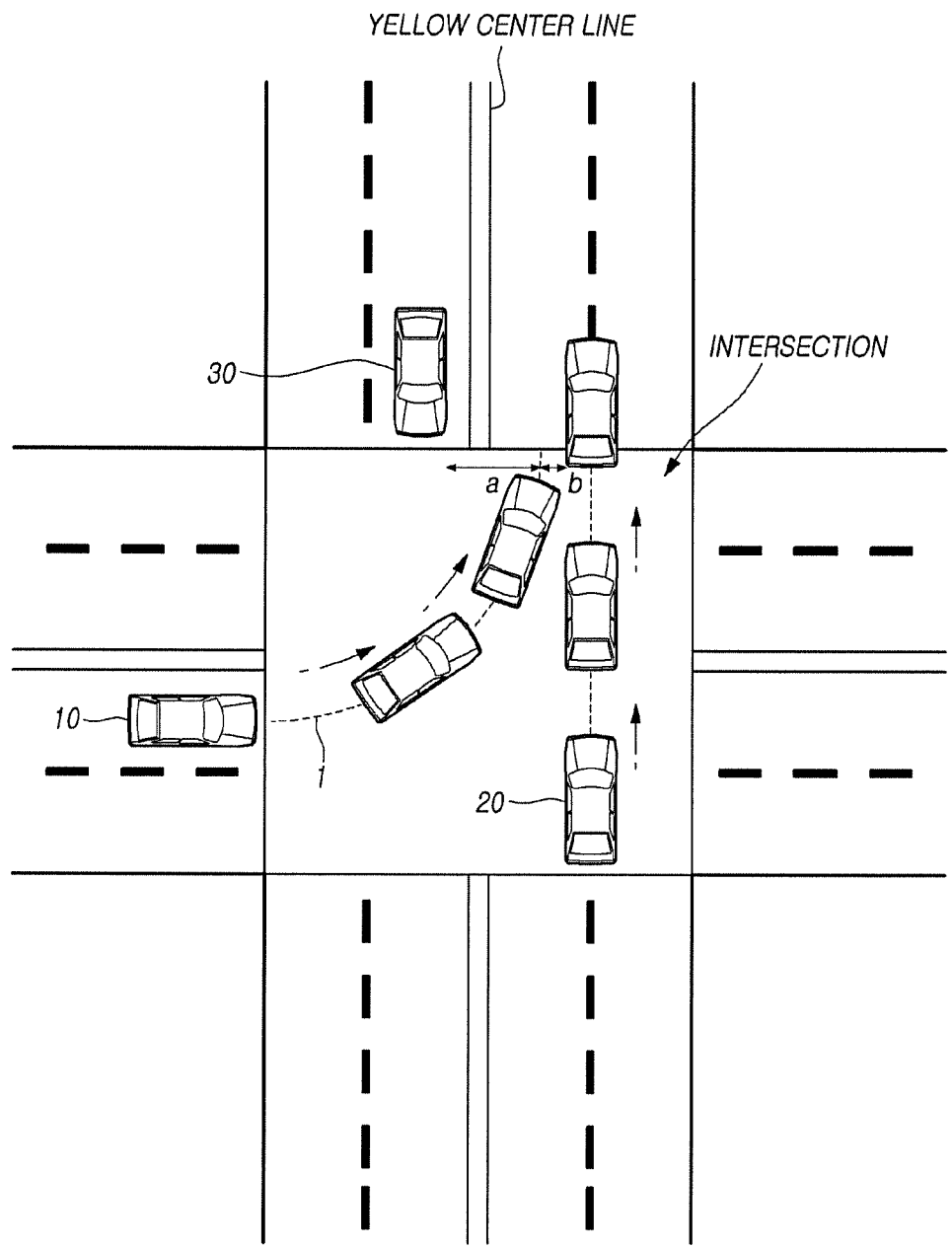
FIG. 4 illustrates a method of calculating a first space by setting a virtual route of a host vehicle through an intersection according to exemplary embodiments.

FIG. 4 illustrates a method of calculating a first space by setting a virtual route of a host vehicle through an intersection collision prevention system according to exemplary embodiments.

Referring to FIG. 4, the collision determination unit 130 according to exemplary embodiments may virtually generate a predicted route of the host vehicle on the basis of a lane in which the host vehicle is to run or travel in after passing through the intersection and may calculate a first space on the basis of a space between the predicted route and at least one of the oncoming vehicle and the yellow center line and a space between the predicted route and the preceding vehicle.

For example, as shown in FIG. 4, the host vehicle 10 may be located in a left turn lane. In this case, the collision determination unit 130 according to exemplary embodiments may recognize at least one of a lane disconnection and a "go straight"/"turn left" indication from image data to determine whether the host vehicle 10 enters an intersection.

When it is determined that the host vehicle 10 enters an intersection, the collision determination unit 130 may generate a predicted route 1 of the host vehicle 10 on the basis of a lane in which the host vehicle 10 is running (or a current location of the host vehicle 10) and a lane in which the host vehicle 10 is to run or travel after passing through the intersection.

For example, the collision determination unit 130 may generate a predicted route 1 of the host vehicle 10 on the basis of the center position of the host vehicle 10 and the center position in the lane in which the host vehicle 10 is to run or travel after passing through the intersection. Also, the collision determination unit 130 may generate a virtual lane on the basis of lanes in which the host vehicle 10 is running and a lane in which the host vehicle is to run after passing through the intersection and may generate a predicted route 1 of the host vehicle 10 on the basis of the generated virtual lanes.

In particular, the collision determination unit 130 may generate the predicted route 1 of the host vehicle 10 in real time, periodically, or at at least one arbitrary time point.

The collision determination unit 130 may calculate a space (a) between the predicted route 1 and the oncoming vehicle 30. The collision determination unit 130 may calculate a space (b) between the predicted route 1 and the preceding vehicle 20.

The collision determination unit 130 may calculate a space (a) between the predicted route 1 and the yellow center line. The collision determination unit 130 may calculate a space (b) between the predicted route 1 and the preceding vehicle 20.

In particular, the collision determination unit 130 may calculate a space between the predicted route 1 and the oncoming vehicle 30, a space between the predicted route 1 and the preceding vehicle 20, a space between the predicted route 1 and the yellow center line, and the like in real time, periodically, or at at least one arbitrary time point.

The collision determination unit 130 may calculate a first space on the basis of the space (a) between the predicted route 1 and the oncoming vehicle 30 and the space (b) between the predicted route 1 and the preceding vehicle 20. The collision determination unit 130 may calculate a first space on the basis of the space (a) between the predicted route 1 and the yellow center line and the space (b) between the predicted route 1 and the preceding vehicle 20.

Here, the method of calculating a first space will not be described in detail for the sake of brevity because the first space calculation method that has been described with reference to FIGS. 2 and 3 may be applied as it is.

The collision determination unit 130 may compare the first space to a predetermined second space to determine a danger of collision. Here, the method of determining a danger of a collision will not be described in detail for the sake of brevity because the collision danger determination method that has been described with reference to FIGS. 2 and 3 may be applied as it is.

The control unit 140 may control operation of at least one of the danger warning device 150, the braking control device 160, and the steering control device 170 on the basis of the determination result of the collision determination unit 130. Here, the control of operation of the danger warning device 150, the braking control device 160, and the steering control device 170 will not be described in detail for the sake of brevity because the control of operation of the danger warning device 150, the braking control device 160, and the steering control device 170 that has been described with reference to FIGS. 2 and 3 may be applied as described.

In addition, when it is determined that the host vehicle 10 does not enter an intersection, the collision determination unit 130 may perform predetermined collision prevention control. Here, the predetermined collision prevention control may be longitudinal collision prevention control. However, the exemplary embodiments are not limited thereto, and the predetermined collision prevention control may be intersection collision prevention control.

The method of setting a virtual route of a host vehicle, calculating a space between a preceding vehicle and at least one of an oncoming vehicle and a yellow center line, and determining a danger of a collision to prevent the collision through the intersection collision prevention system according to exemplary embodiments may be applied when the host vehicle turns left, as shown in the drawings. However, the exemplary embodiments are not limited thereto, and the method may also be applied when the host vehicle goes straight and when the host vehicle turns right.

An intersection collision prevention method according to exemplary embodiments will be described below with reference to the accompanying drawings (including FIGS. 5 to 13). Particularly, the parts associated with the intersection collision prevention system according to exemplary embodiments which have been described above will no longer be described below for the sake of brevity.

The intersection collision prevention method according to exemplary embodiments may be performed by means of the intersection collision prevention system 100 according to exemplary embodiments including a camera sensor 110, a radar sensor 120, a collision determination unit 130, a control unit 140, a danger warning device 150, a braking control device 160, a steering control device 170, and the like.

Figure 5:
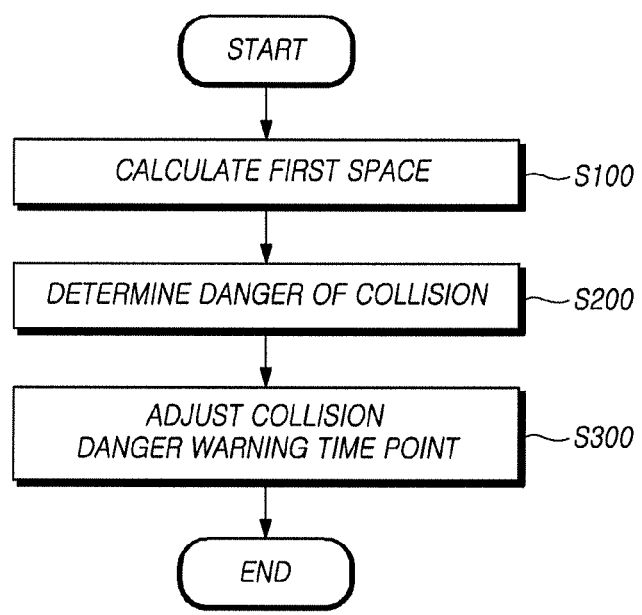
FIG. 5 is a flowchart illustrating an intersection collision prevention method according to exemplary embodiments.

FIG. 5 is a flowchart illustrating an intersection collision prevention method according to exemplary embodiments.

Referring to FIG. 5, the intersection collision prevention method according to exemplary embodiments may include calculating a first space (S100), determining a danger of a collision (S200), and adjusting a collision danger warning time point (S300).

First, a first space between a preceding vehicle running in the same direction as a host vehicle and at least one of a yellow center line and an oncoming vehicle located in the opposite lane with respect to the host vehicle may be calculated (S100).

Subsequently, a danger of a collision may be determined by comparing the first space calculated in step S100 to a predetermined second space (S200).

Subsequently, a collision danger warning time point may be adjusted according to a result of determining the danger of a collision in step S200 (S300).

Figure 6:
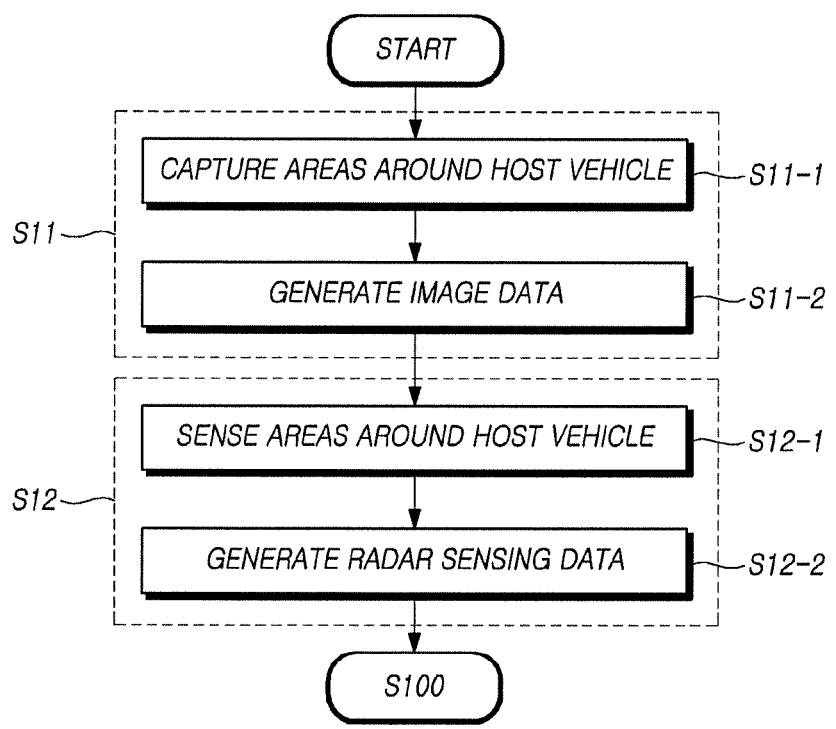
FIG. 6 is a flowchart illustrating a method of acquiring image data and radar sensing data according to exemplary embodiments.

FIG. 6 is a flowchart illustrating a method of acquiring image data and radar sensing data according to exemplary embodiments.

Referring to FIG. 6, the intersection collision prevention method according to exemplary embodiments may further include at least one of acquiring image data (S11) and acquiring radar sensing data (S12) before the calculation of a first space (S100).

In the acquisition of image data (S11), areas around the host vehicle may be captured to generate the image data. For example, first, the areas around the host vehicle may be captured through a camera sensor (S11-1). Subsequently, the image data may be generated (e.g., though image processing) on the basis of information regarding the areas around the host vehicle captured in step S11-1 (S11-2).

In the acquisition of radar sensing data (S12), areas around the host vehicle may be sensed to generate the radar sensing data. For example, first, the areas around the host vehicle may be sensed through a radar sensor (S12-1). Subsequently, the radar sensing data may be generated on the basis of information regarding the areas around the host vehicle sensed in step S12-1 (S12-2).

Referring to FIG. 5 again, in step S100, a first space between a preceding vehicle and at least one of a yellow center line and an oncoming vehicle may be calculated on the basis of at least one of the image data and the radar sensing data.

Subsequently, in step S200, a danger of a collision may be determined by comparing the first space calculated in step S100 to a predetermined second space.

Subsequently, in step S300, a collision danger warning time point may be adjusted according to a result of determining the danger of a collision in step S200.

FIGS. 7 to 10 are flowcharts illustrating a method of calculating a first space according to exemplary embodiments.

Figure 7:
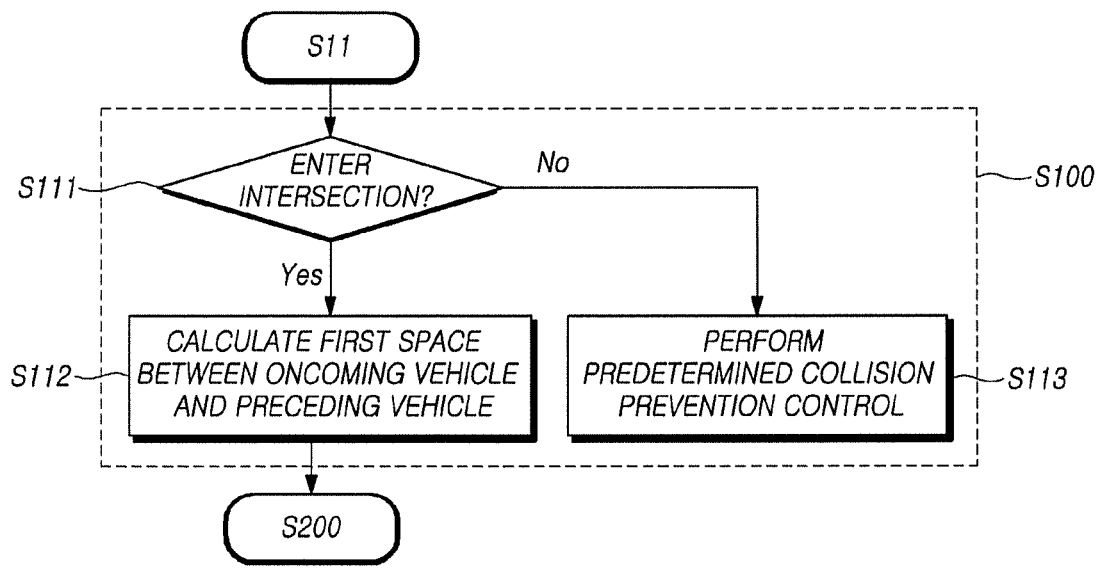
FIGS. 7, 8, 9, and 10 are flowcharts illustrating a method of calculating a first space according to exemplary embodiments.

Referring to FIG. 7, the method of calculating a first space according to exemplary embodiments may include calculating a first space between a preceding vehicle running in the same direction as a host vehicle and an oncoming vehicle located in the opposite lane with respect to the host vehicle.

That is, in step S112, the first space between the preceding vehicle running in the same direction as the host vehicle and the vehicle running in the opposite direction, that is, the oncoming vehicle located in the opposite lane with respect to the host vehicle may be calculated on the basis of at least one of the image data received in step S11 and the radar sensing data received in step S12. In certain embodiments, the first space is calculated or measured in a direction orthogonal to a direction of travel of (or a predicted route of) the host vehicle.

In particular, in step S112, the first space may be calculated by using at least one of the width of the host vehicle, the center position in the host vehicle, the current location of the host vehicle, the width of the oncoming vehicle, the center position in the oncoming vehicle, the current location of the oncoming vehicle, the width of the preceding vehicle, the center position in the preceding vehicle, and the current location of the preceding vehicle.

As an example, in step S112, the first space may be calculated by using a distance from a predetermined position in the host vehicle to one side of the oncoming vehicle and a distance from a predetermined position in the host vehicle to one side of the preceding vehicle. Here, the one side of the oncoming vehicle and the one side of the preceding vehicle may be left sides with respect to their running directions, as shown in the drawings. However, the exemplary embodiments are not limited thereto, and the one side of the oncoming vehicle and the one side of the preceding vehicle may be sides adjacent to (or closest to, from among sides of the oncoming and preceding vehicles, respectively) the host vehicle with respect to their running directions. Here, the predetermined position in the host vehicle may be the center position in the host vehicle. However, the exemplary embodiments are not limited thereto, and the predetermined position may include any position in the host vehicle.

As another example, in step S112, the first space may be calculated by using the width of the host vehicle, the center position in the host vehicle, the width of the oncoming vehicle, the center position in the oncoming vehicle, the width of the preceding vehicle, and the center position in the preceding vehicle.

That is, in step S112, first, a first distance between the center of the width of the host vehicle and the center of the width of the preceding vehicle may be calculated on the basis of at least one of the image data received in step S11 and the radar sensing data received in step S12.

Subsequently, a second distance between the center of the width of the host vehicle and the center of the width of a vehicle running in the opposite direction, that is, the oncoming vehicle located in the opposite lane with respect to the host vehicle may be calculated on the basis of at least one of the image data received in step S11 and the radar sensing data received in step S12.

Subsequently, a third distance, which is the width of the preceding vehicle, may be calculated on the basis of at least one of the image data received in step S11 and the radar sensing data received in step S12.

Subsequently, a fourth distance, which is the width of the vehicle running in the opposite direction, that is, the oncoming vehicle located in the opposite lane with respect to the host vehicle may be calculated on the basis of at least one of the image data received in step S11 and the radar sensing data received in step S12.

Subsequently, the first space between the preceding vehicle running in the same direction as the host vehicle and the vehicle running in the opposite direction, that is, the oncoming vehicle located in the opposite lane with respect to the host vehicle may be calculated using Equation 1 below:

$$A = (B1 - B3/2) + (B2 - B4/2) \quad \text{[Equation 1]}$$

As shown in Equation 1, a first value may be calculated by dividing a third width B3 by two and then subtracting the quotient from a first width B1. Also, a second value may be calculated by dividing a fourth width B4 by two and then subtracting the quotient from a second width B2. Subsequently, a first space A between the preceding vehicle 20 running in the same direction as the host vehicle 10 and the vehicle running in the opposite direction, that is, the oncoming vehicle 30 located in the opposite lane with respect to the host vehicle 10 may be calculated by adding the first value and the second value.

The method of calculating a first space according to exemplary embodiments may further include determining whether the host vehicle enters an intersection (S111) before step S112.

For example, in step S111, at least one of a lane disconnection and a "go straight"/"turn left" indication may be recognized from the image data to determine whether the host vehicle enters an intersection.

Step S112 or step S113 may be performed depending on the determination result of step S111.

That is, when the determination result of step S111 is that the host vehicle enters the intersection, the first space may be calculated through step S112. Also, when the determination result of step S111 is that the host vehicle does not enter the intersection, predetermined collision prevention control may be performed through step S113. Here, the predetermined collision prevention control may be longitudinal collision prevention control. However, the exemplary embodiments are not limited thereto, and the predetermined collision prevention control may be intersection collision prevention control.

Figure 8:
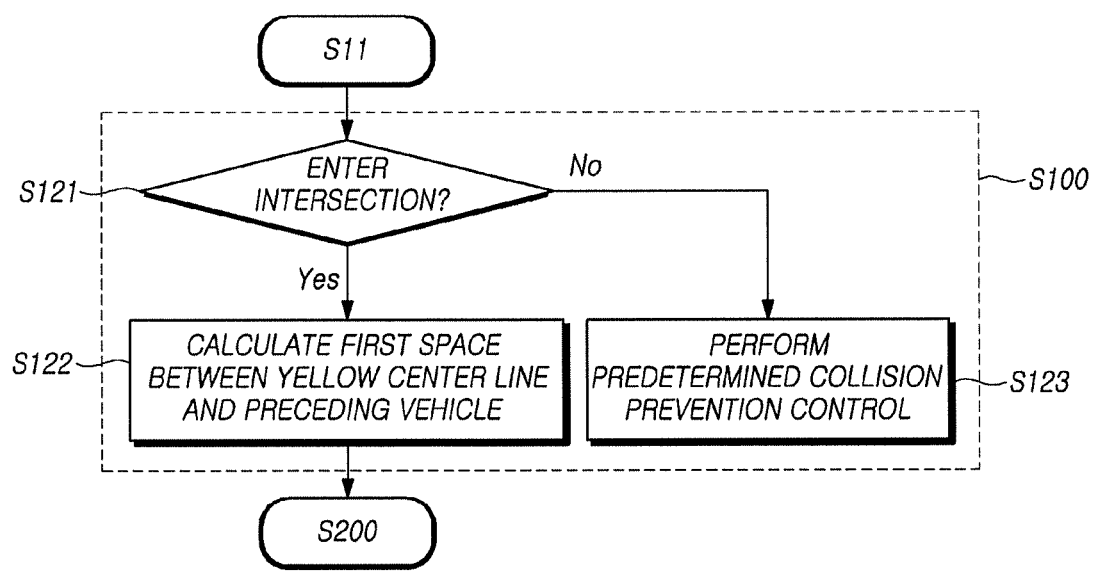

Referring to FIG. 8, the method of calculating a first space according to exemplary embodiments may include calculating a first space between the yellow center line and the preceding vehicle running in the same direction as the host vehicle (S122).

That is, in step S122, the first space between the yellow center line and the preceding vehicle running in the same direction as the host vehicle may be calculated on the basis of at least one of the image data received in step S11 and the radar sensing data received in step S12.

In particular, in step S122, the first space may be calculated by using at least one of the width of the host vehicle, the center position in the host vehicle, the current location of the host vehicle, the yellow center line, the width of the preceding vehicle, the center position in the preceding vehicle, and the current location of the preceding vehicle.

As an example, in step S122, the first space may be calculated by using a distance from a predetermined position in the host vehicle to the yellow center line and a distance from a predetermined position in the host vehicle to one side of the preceding vehicle. Here, the one side of the preceding vehicle may be a left side with respect to its running direction, as shown in the drawings. However, the exemplary embodiments are not limited thereto, and the one side of the preceding vehicle may be a side adjacent to the host vehicle with respect to its running direction. Here, the predetermined position in the host vehicle may be the center position in the host vehicle. However, the exemplary embodiments are not limited thereto, and the predetermined position may include any position in the host vehicle.

As another example, in step S122, the first space may be calculated by using the width of the host vehicle, the center position in the host vehicle, the yellow center line, the width of the preceding vehicle, and the center position in the preceding vehicle.

That is, in step S122, a first distance between the center of the width of the host vehicle and the center of the width of the preceding vehicle may be calculated on the basis of at least one of the image data received in step S11 and the radar sensing data received in step S12.

Subsequently, a second distance between the center of the width of the host vehicle and the yellow center line may be calculated on the basis of at least one of the image data received in step S11 and the radar sensing data received in step S12.

Subsequently, a third distance, which is the width of the preceding vehicle, may be calculated on the basis of at least one of the image data received in step S11 and the radar sensing data received in step S12.

Subsequently, the first space may be calculated by dividing the third distance by two, subtracting the quotient from the first distance, and adding the second distance to the difference.

The method of calculating a first space according to exemplary embodiments may further include determining whether the host vehicle enters an intersection (S121) before step S122.

For example, in step S121, at least one of a lane disconnection and a "go straight"/"turn left" indication may be recognized from the image data to determine whether the host vehicle enters an intersection.

Step S122 or step S123 may be performed depending on the determination result of step S121.

That is, when the determination result of step S121 is that the host vehicle enters the intersection, the first space may be calculated through step S122. Also, when the determination result of step S121 is that the host vehicle does not enter the intersection, predetermined collision prevention control may be performed through step S123. Here, the predetermined collision prevention control may be longitudinal collision prevention control. However, the exemplary embodiments are not limited thereto, and the predetermined collision prevention control may be intersection collision prevention control.

Figure 9:
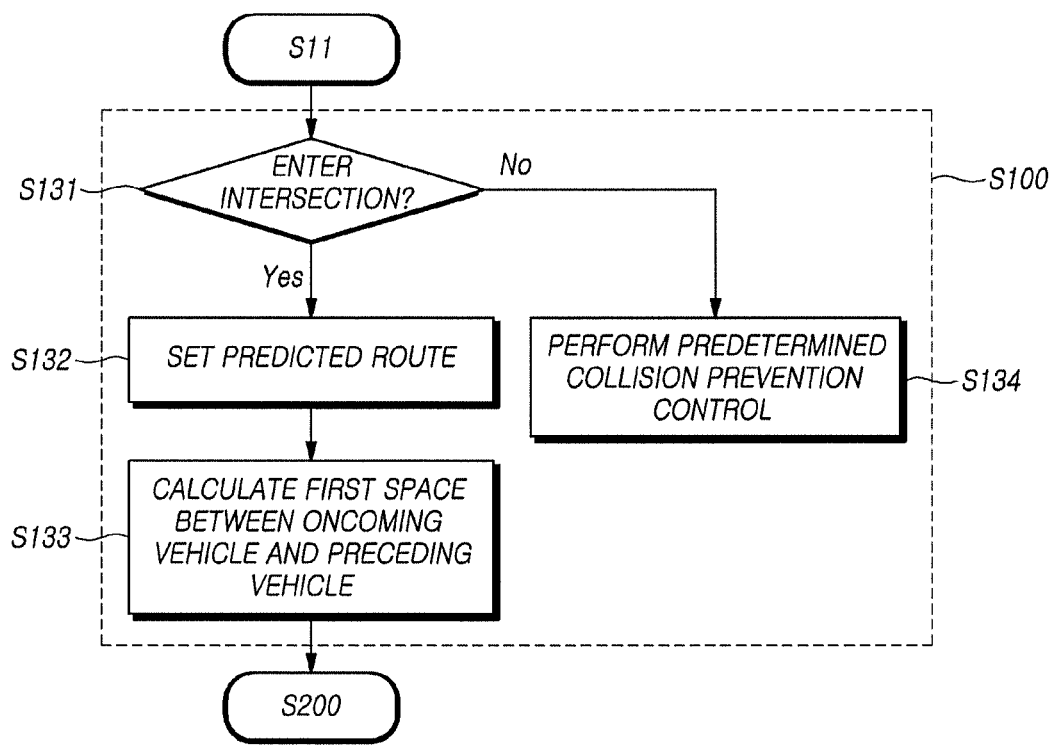

Referring to FIG. 9, first, the method of calculating a first space according to exemplary embodiments may include generating a predicted route of the host vehicle on the basis of a lane in which the host vehicle is to run (S132).

That is, in step S132, the predicted route of the host vehicle may be generated on the basis of a lane in which the host vehicle is currently running (or the current location of the host vehicle) and a lane in which the host vehicle is to run after passing through the intersection.

For example, in step S132, the predicted route of the host vehicle may be generated on the basis of the center position in the host vehicle and the center position in the lane in which the host vehicle is to run after passing through the intersection. Also, in step S132, a virtual lane may be generated on the basis of lanes in which the host vehicle is running and a lane in which the host vehicle is to run after passing through the intersection, and a predicted route of the host vehicle may be generated on the basis of the generated virtual lane.

In particular, in step S132, the predicted route of the host vehicle may be generated in real time, periodically, or at at least one arbitrary time point.

Subsequently, the first space may be calculated on the basis of the space between the oncoming vehicle and the predicted route generated in step S132 and the space between the preceding vehicle and the predicted route generated in step S132 (S133).

For example, first, the space between the predicted route and the oncoming vehicle may be calculated. Subsequently, the space between the predicted route and the preceding vehicle may be calculated. In particular, the space between the predicted route and the oncoming vehicle, the space between the predicted route and the preceding vehicle, and the like may be calculated in real time, periodically, or at at least one arbitrary time point. Subsequently, the first space may be calculated on the basis of the space between the predicted route and the oncoming vehicle and the space between the predicted route and the preceding vehicle.

Also, step S133 will not be described in detail for the sake of brevity because the first space calculation method of step S112 that has been described with reference to FIG. 7 may be applied as it is.

The method of calculating a first space according to exemplary embodiments may further include determining whether the host vehicle enters an intersection (S131) before step S132.

For example, in step S131, at least one of a lane disconnection and a "go straight"/"turn left" indication may be recognized from the image data to determine whether the host vehicle enters an intersection.

Step S132 and step S133, or step S134, may be performed depending on the determination result of step S131.

That is, when the determination result of step S131 is that the host vehicle enters the intersection, the predicted route of the host vehicle may be virtually generated through step S132, and the first space may be calculated through step S133. Also, when the determination result of step S131 is that the host vehicle does not enter the intersection, predetermined collision prevention control may be performed through step S134. Here, the predetermined collision prevention control may be longitudinal collision prevention control. However, the exemplary embodiments are not limited thereto, and the predetermined collision prevention control may be intersection collision prevention control.

Figure 10:
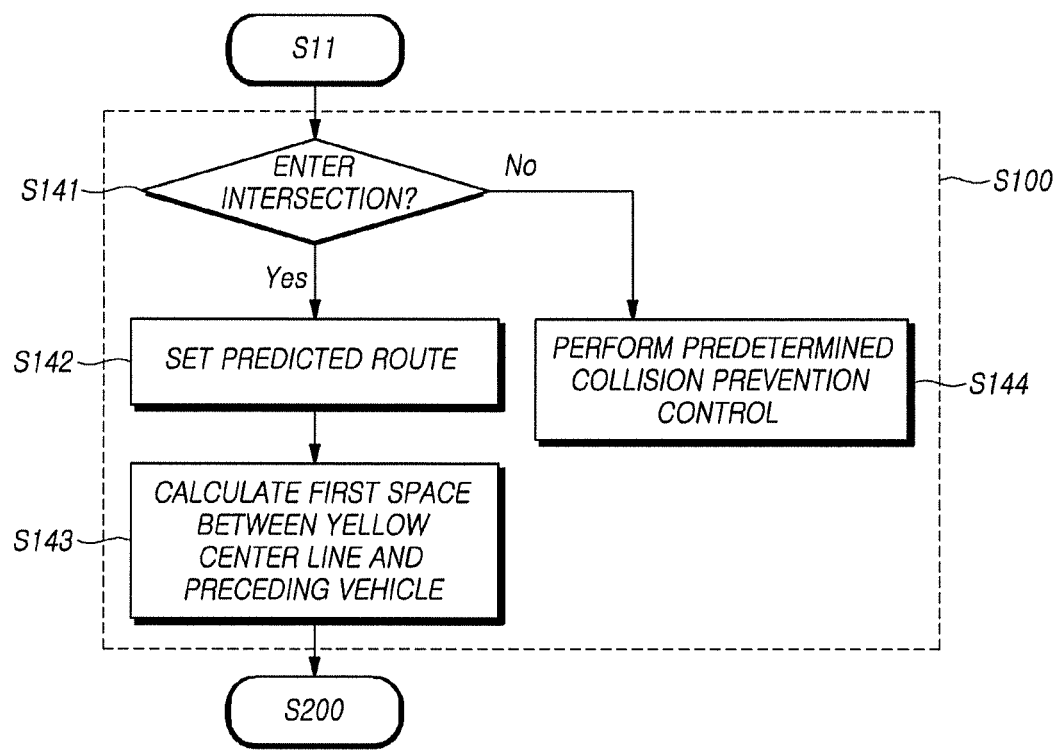

Referring to FIG. 10, first, the method of calculating a first space according to exemplary embodiments may include generating a predicted route of the host vehicle on the basis of a lane in which the host vehicle is to run (S142).

That is, in step S142, the predicted route of the host vehicle may be generated on the basis of a lane in which the host vehicle is currently running (or the current location of the host vehicle) and a lane in which the host vehicle is to run after passing through the intersection.

For example, in step S142, the predicted route of the host vehicle may be generated on the basis of the center position in the host vehicle and the center position in the lane in which the host vehicle is to run after passing through the intersection. Also, in step S142, a virtual lane may be generated on the basis of lanes in which the host vehicle is running and a lane in which the host vehicle is to run after passing through the intersection, and a predicted route of the host vehicle may be generated on the basis of the generated virtual lane.

In particular, in step S142, the predicted route of the host vehicle may be generated in real time, periodically, or at at least one arbitrary time point.

Subsequently, the first space may be calculated on the basis of the space between the yellow center line and the predicted route generated in step S142 and the space between the preceding vehicle and the predicted route generated in step S142 (S143).

For example, first, the space between the predicted route and the yellow center line may be calculated. Subsequently, the space between the predicted route and the preceding vehicle may be calculated. In particular, the space between the predicted route and the yellow center line, the space between the predicted route and the preceding vehicle, and the like may be calculated in real time, periodically, or at at least one arbitrary time point. Subsequently, the first space may be calculated on the basis of the space between the predicted route and the yellow center line and the space between the predicted route and the preceding vehicle.

Also, step S143 will not be described in detail for the sake of brevity because the first space calculation method of step S122 that has been described with reference to FIG. 8 may be applied.

The method of calculating a first space according to exemplary embodiments may further include determining whether the host vehicle enters an intersection (S141) before step S142.

For example, in step S141, at least one of a lane disconnection and a "go straight"/"turn left" indication may be recognized from the image data to determine whether the host vehicle enters an intersection.

Step S142 and step S143, or step S144, may be performed depending on the determination result of step S141.

That is, when the determination result of step S141 is that the host vehicle enters the intersection, the predicted route of the host vehicle may be virtually generated through step S142 and the first space may be calculated through step S143. Also, when the determination result of step S141 is that the host vehicle does not enter the intersection, predetermined collision prevention control may be performed through step S144. Here, the predetermined collision prevention control may be longitudinal collision prevention control. However, the exemplary embodiments are not limited thereto, and the predetermined collision prevention control may be intersection collision prevention control.

The intersection collision prevention method according to exemplary embodiments may control at least one of a collision danger warning time point, a braking force, and a steering force on the basis of a collision danger determination result. The control of the collision danger warning time point, the braking force, and the steering force according to the collision danger determination result will be described below with reference to the accompanying drawings.

Figure 11:
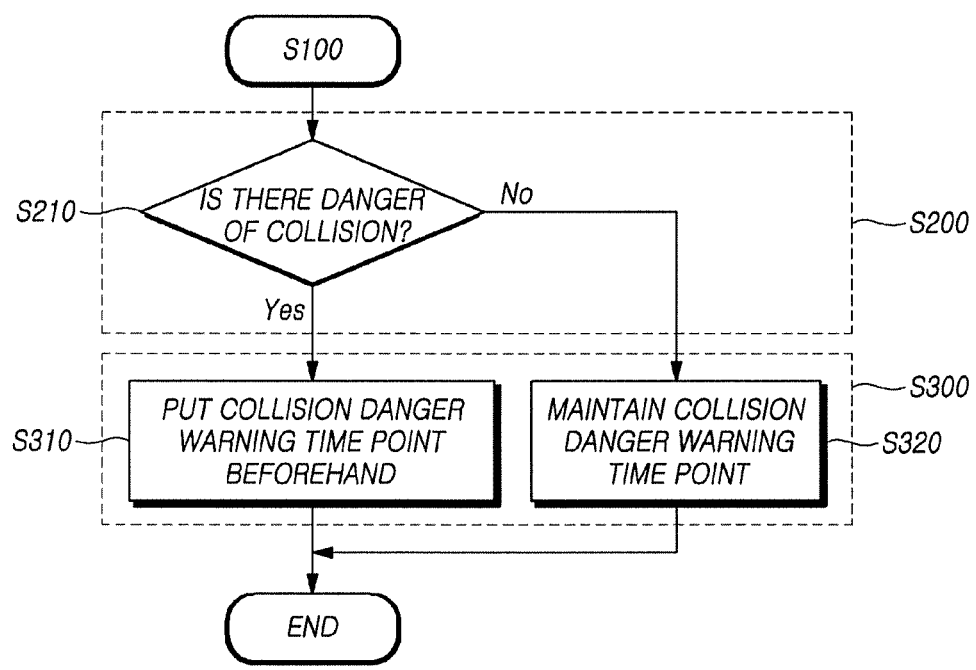
FIG. 11 is a flowchart illustrating a method of adjusting a collision danger warning time point on the basis of a collision danger determination result according to exemplary embodiments.

FIG. 11 is a flowchart illustrating a method of adjusting a collision danger warning time point on the basis of a collision danger determination result according to exemplary embodiments.

Figure 12:
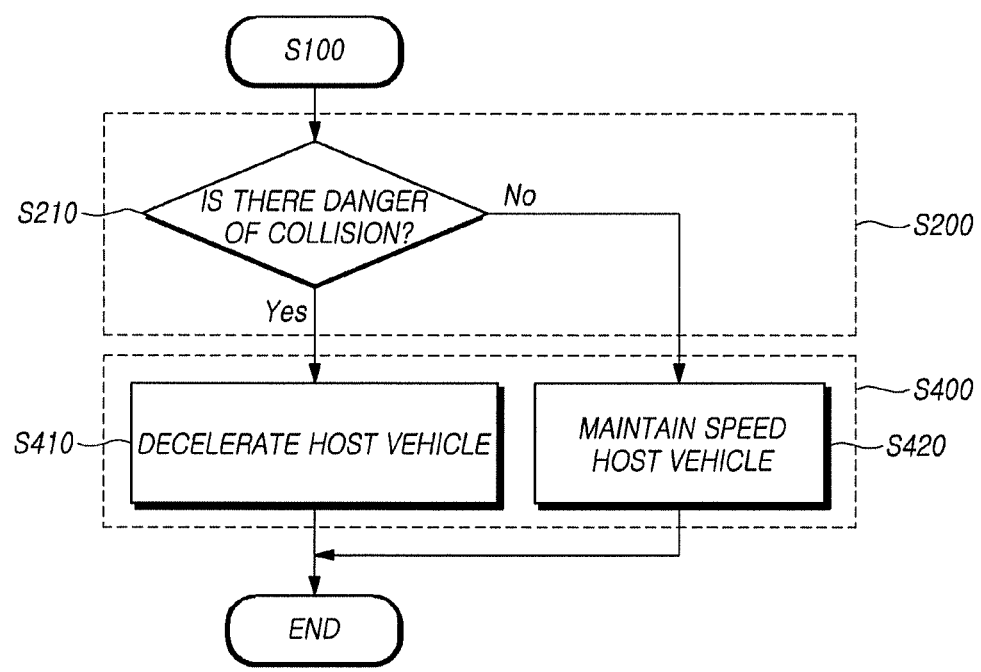
FIG. 12 is a flowchart illustrating a method of adjusting a braking force on the basis of a collision danger determination result according to exemplary embodiments.

FIG. 12 is a flowchart illustrating a method of adjusting a braking force on the basis of a collision danger determination result according to exemplary embodiments.

Figure 13:
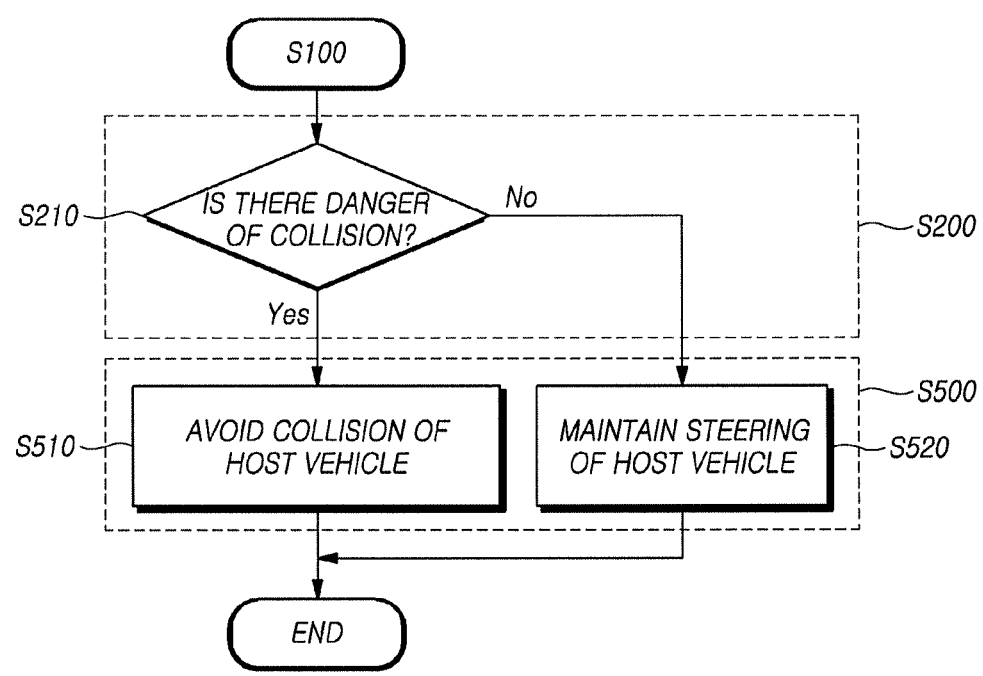
FIG. 13 is a flowchart illustrating a method of adjusting a steering force on the basis of a collision danger determination result according to exemplary embodiments.

FIG. 13 is a flowchart illustrating a method of adjusting a steering force on the basis of a collision danger determination result according to exemplary embodiments.

Referring to FIGS. 11 to 13, first, a danger of collision of a host vehicle may be determined (S210). That is, in step S210, the danger of collision may be determined by comparing the first space calculated in step S100 to a reference value (a second space).

For example, in step S210, it may be determined that there is a danger of collision when the first space is compared to the reference value (the second space) and is less than the reference value (the second space). On the other hand, in step S210, it may be determined that there is no danger of a collision when the first space is compared to the reference value (the second space) and is greater than or equal to the reference value (the second space).

When the first space is greater than the width of the host vehicle, the host vehicle can pass with no collision. However, when the host vehicle is actually running, the first space may need to be much greater than the width of the host vehicle. Accordingly, the reference value may be set to a value greater than the width of the host vehicle, and the reference value (the second space) may be set to a value obtained by adding a certain margin a to the width of the host vehicle. In this case, the certain margin a may be set to a value of 10 cm to 100 cm. However, the exemplary embodiments are not limited thereto, and the certain margin a may be modified and set.

Referring to FIG. 11, the method of adjusting a collision danger warning time point according to exemplary embodiments may include adjusting the collision danger warning time point according to the collision danger determination result of step S210 (S300).

Subsequently, when the collision danger determination result of step S210 is that there is a danger of collision, a warning about the danger of a collision may be given to put the collision danger warning time point earlier than a reference value (S310).

For example, when the collision danger determination result of step S210 is that there is a danger of collision, a danger warning device may be controlled to put the collision danger warning time point earlier than a reference value. That is, when there is a danger of a collision because a route along which the host vehicle will pass has a small width, the danger warning device may be controlled to put the collision danger warning time point earlier than a default value. Here, the warning time point may be calculated from a TTC map based on speed of the host vehicle.

When the collision danger determination result of step S210 is that there is less or no danger of collision, a warning about the danger of a collision may be controlled to maintain the collision danger warning time point at the reference value (S320).

For example, when the collision danger determination result of step S210 is that there is little or no danger of collision, the danger warning device may be controlled to maintain the collision danger warning time point at the reference value. That is, when it is determined that there is little or no danger of collision because a route along which the host vehicle will pass has a large width, the danger warning device may be controlled to maintain the collision danger warning time point at the default value.

The collision danger warning according to exemplary embodiments may be provided through at least one of a signal output, a display output, and a haptic output.

That is, the danger warning device may generate a warning signal in at least one of an audio type, a video type, and a haptic type in order to warn a driver of a specific danger situation. For example, in order to output a warning sound, the danger warning device may use a car sound system to output the warning sound. Alternatively, in order to display a warning message, the danger warning device may output the warning message through a HUD display or a side mirror display. Alternatively, in order to generate a warning vibration, the danger warning device may operate a vibration motor mounted on a steering wheel.

Referring to FIG. 12, the method of adjusting a braking force according to exemplary embodiments may include adjusting the braking force according to the collision danger determination result of step S210 (S400).

When the collision danger determination result of step S210 is that there is a danger of collision, the braking force may be generated so that the host vehicle is decelerated relative to a reference value (S410).

For example, when the collision danger determination result of step S210 is that there is a danger of collision because a route along which the host vehicle will pass has a small width, the braking control device may be controlled to decelerate the host vehicle. In this case, in order to avoid the collision, a deceleration rate should be large, and thus the braking control device may be controlled so that the deceleration rate is greater than an average deceleration rate. Here, the average deceleration rate may be calculated on the basis of the widths of two vehicles or the distance between the yellow center line and the preceding vehicle, and the deceleration may be performed according to the average deceleration rate. As another example, the average deceleration rate refers to an average braking force needed to avoid a collision, and the average deceleration rate may be calculated on the basis of an average value between a minimum braking rate and a maximum braking rate that are needed to avoid a collision.

As another example, when the collision danger determination result of step S210 is that there is a danger of a collision because a route along which the host vehicle will pass has a small width, the braking control device may be controlled to decelerate the host vehicle. In this case, in order to avoid the collision, a deceleration rate should be large, and thus the braking control device may be controlled to maximize the deceleration rate.

When the collision danger determination result of step S210 is that there is less or no danger of a collision, the braking force may be controlled to maintain the speed of the host vehicle at a reference value (S420).

For example, when the collision danger determination result of step S210 is that there is little or no danger of a collision, the braking control device may be controlled to maintain the speed of the host vehicle at the reference value. That is, when the collision danger determination result of step S210 is that there is little or no danger of a collision because a route along which the host vehicle will pass has a large width, the braking control device may be controlled to maintain the speed of the host vehicle at the reference value. In this case, the danger of a collision is low, and thus the braking control device may be controlled so that the deceleration rate is smaller than or equal to the average deceleration rate.

Here, the braking control device may control operation of a car brake and may also control pressure of the brake. For example, when a forward collision is probable, the braking control device may perform control so that an emergency brake is automatically operated on the basis of a control signal, irrespective of whether a driver has operated a brake.

Referring to FIG. 13, the method of adjusting a steering force according to exemplary embodiments may include adjusting the steering force according to the collision danger determination result of step S210 (S500).

When the collision danger determination result of step S210 is that there is a danger of a collision, the steering force may be generated so that the host vehicle is steered to avoid the collision (S510).

For example, when the collision danger determination result of step S210 is that there is a danger of a collision, the steering control device may be controlled so that the host vehicle is steered to avoid the collision.

Here, the steering control device may control a motor-driven power steering (MDPS) system for operating a steering wheel. For example, when a car collision is probable, the steering control device may control steering of a car to a direction in which the collision can be avoided.

When the collision danger determination result of step S210 is that there is less or no danger of a collision, the steering force may be controlled to maintain the steering of the host vehicle at a reference value (S520).

For example, when the collision danger determination result of step S210 is that there is less or no danger of a collision, the steering control device may be controlled to maintain the steering of the host vehicle at the reference value.

Even when a route along which the host vehicle will pass has a large width, the danger of a collision may increase if the host vehicle is leaned toward one side. Accordingly, in order to reduce the danger of a collision, the steering control device may be controlled so that the host vehicle passes through the center of the first space between the preceding vehicle running in the same direction as the host vehicle and the vehicle running in the opposite direction, that is, the oncoming vehicle located in the opposite lane with respect to the host vehicle. That is, when the collision danger determination result of step S210 is that the first space is greater than the second space, the steering control device may be controlled so that the host vehicle passes through the center of the first space.

The intersection collision prevention method according to exemplary embodiments may include giving a warning about a danger of a collision with the vehicle running in the opposite direction, that is, the oncoming vehicle 30 located in the opposite lane with respect to the host vehicle 10 and performing braking control when the host vehicle 10 enters and passes through an intersection. Also, the intersection collision prevention method according to exemplary embodiments may include giving a warning about a danger of a collision with the preceding vehicle 20 running in the same direction as the host vehicle 10 and performing braking control when the host vehicle 10 enters and passes through an intersection.

According to the intersection collision prevention system and method according exemplary embodiments, it is possible to give a warning about a danger of a collision with a vehicle running in the opposite direction, that is, an oncoming vehicle located in the opposite lane and perform braking control when a host vehicle enters and passes through an intersection.

According to the intersection collision prevention system and method according exemplary embodiments, it is also possible to give a warning about a danger of a collision with a preceding vehicle running in the same direction and perform braking control when a host vehicle enters and passes through an intersection.

In one or more exemplary embodiments, the functions described may be implemented in hardware, software, firmware, or any combination thereof. If implemented in software, the functions can be stored on or transmitted as one or more instructions or code on a computer-readable medium.

Computer-readable media include all of communication media and computer storage media including any medium for facilitating transfer of a computer program from one place to another place. Storage media may be any available media that can be accessed by a computer. By way of example, and not limitation, such computer-readable media can include a RAM, ROM, EEPROM, CD-ROM or other optical disk storage, magnetic disk storage or other magnetic storage devices, or any other non-transitory medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

When exemplary embodiments are implemented by program code or code segments, each code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. Additionally, in some aspects, the steps and/or operations of a method or algorithm may reside as one or any combination or set of codes and/or instructions on a machine-readable medium and/or computer-readable medium, which may be incorporated into a computer program product.

For a software implementation, the techniques described herein may be implemented with modules (e.g., procedures, functions, and so on) that perform the functions described herein. Software codes may be stored in memory units and executed by processors. The memory unit may be implemented within the processor or external to the processor, in which case it can be communicatively coupled to the processor via various means as is known in the art.

For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alternatives, modifications and variations that fall within the spirit and scope of the appended claims. Furthermore, to the extent that the term "includes" is used in either the detailed description or the claims, such a term is intended to be inclusive in a manner similar to the term "comprising" as "comprising" is interpreted when employed as a transitional word in a claim.

The term "infer" or "inference," as used herein, refers generally to the process of reasoning about or inferring states of a system, environment, and/or user from a set of observations as captured via events and/or data. Inference can be employed to identify a specific context or action, or can generate a probability distribution over states, for example. The inference can be probabilistic, that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can be executed from various computer readable media having various data structures stored thereon. The components may communicate by way of local and/or remote processes such as in accordance with a signal having one or more data packets (e.g., data from one component interacting with another component in a local system, distributed system, and/or across a network, such as the Internet, with other systems by way of the signal).

What is claimed is:

1. A collision monitoring system of a host vehicle comprising:
   at least one of a camera sensor or a radar sensor mounted to the host vehicle and having a field of view outside of the host vehicle; and
   a controller communicatively connected to the at least one of the camera sensor or the radar sensor and configured to perform functions to:
      determine a first lateral distance between a preceding vehicle running in a same direction as the host vehicle and a roadway center line apparent on a roadway surface;
      compare the first lateral distance to a predetermined second lateral distance to determine a danger of collision; and
      control a danger warning device to generate a warning signal according to a result of the comparison.

2. The collision monitoring system of claim 1, wherein the at least one of the camera sensor or the radar sensor is configured to sense areas around the host vehicle and generate image data or radar sensing data, and the controller determines the first lateral distance between the preceding vehicle and the roadway center line on the basis of the image data or the radar sensing data.

3. The collision monitoring system of claim 2, wherein the controller recognizes, from the image data, a lane disconnection or at least one of a "go straight" or "turn left" marker in the sense areas around the host vehicle and determines whether the host vehicle enters an intersection.

4. The collision monitoring system of claim 3, wherein the controller generates a predicted route for the host vehicle on the basis of a lane in which the host vehicle is to run after passing through the intersection, and determines the first lateral distance on the basis of a lateral distance between the predicted route and the roadway center line and a lateral distance between the predicted route and the preceding vehicle.

5. The collision monitoring system of claim 1, wherein when the controller determines that there is a danger of collision, the controller controls a braking controller of the host vehicle to generate a brake force according to the result of the comparison.

6. The collision monitoring system of claim 1, wherein when the controller determines that the first lateral distance is greater than the second lateral distance, the controller controls a steering controller so that a center position of the host vehicle is to pass through a center of the first lateral distance.

7. The collision monitoring system of claim 1, wherein the controller determines the danger of collision by using a width of the host vehicle, a width of the preceding vehicle, and a center position in the preceding vehicle.

8. The collision monitoring system of claim 1, wherein the controller determines the danger of collision based on the comparison between the predetermined second lateral distance and the first lateral distance,
wherein the predetermined second lateral distance is determined according to a width of the host vehicle, and the first lateral distance is determined according to a position of the roadway center line, a width of the preceding vehicle, and a center position in the preceding vehicle.

9. A collision monitoring method comprising:
determining, based on sensing data captured by a sensor mounted to a host vehicle, a first lateral distance between a preceding vehicle running in a same direction as the host vehicle and a roadway center line apparent on a roadway surface;
comparing, in a processor coupled to the sensor mounted to the host vehicle, the first lateral distance to a predetermined second lateral distance to determine a danger of collision; and
controlling a danger warning device communicatively connected to the processor to generate a warning signal according to a result of the comparison.

10. The collision monitoring method of claim 9, further comprising, before the determining of the first lateral distance, at least one of:
capturing, by a camera sensor mounted to the host vehicle, images of areas around the host vehicle and generating image data; or
sensing, by a radar sensor mounted to the host vehicle, the areas around the host vehicle and generating radar sensing data,
wherein the determining the first lateral distance comprises determining the first lateral distance between the preceding vehicle and the roadway center line on the basis of at least one of the image data or the radar sensing data.

11. The collision monitoring method of claim 10, wherein the determining the first lateral distance comprises:
recognizing, from the image data, a lane disconnection or at least one of a "go straight" or "turn left" marker in the areas around the host vehicle;
determining whether the host vehicle enters an intersection; and
determining the first lateral distance in response to determining that the host vehicle enters the intersection.

12. The collision monitoring method of claim 11, wherein in response to determining that the host vehicle enters the intersection, the determining the first lateral distance comprises:
generating a predicted route for the host vehicle on the basis of a lane in which the host vehicle is to run after passing through the intersection; and
determining the first lateral distance on the basis of a lateral distance between the predicted route and the roadway center line and a lateral distance between the predicted route and the preceding vehicle.

13. The collision monitoring method of claim 9, further comprising, before the controlling the danger warning device to generate the warning signal, controlling a braking controller to apply brakes of the host vehicle in response to determining the danger of collision.

14. The collision monitoring method of claim 9, further comprising, before the controlling the danger warning device to generate the warning signal, controlling a steering controller to steer the host vehicle so that a center position of the host vehicle is directed to pass through a center of the first lateral distance in response to determining that the first lateral distance is greater than the predetermined second lateral distance.

15. The collision monitoring method of claim 9, wherein the first lateral distance is determined by using a width of the host vehicle, a width of the preceding vehicle, and a center position in the preceding vehicle.

16. The collision monitoring method of claim 9, wherein the danger of collision is determined based on the comparison between the predetermined second lateral distance and the first lateral distance,
wherein the predetermined second lateral distance is determined according to a width of the host vehicle, and the first lateral distance is determined according to a position of the roadway center line, a width of the preceding vehicle, and a center position in the preceding vehicle.

17. A collision monitoring method for a host vehicle comprising:
sensing, using at least one of a camera sensor or a radar sensor mounted to the host vehicle, an area around the host vehicle to generate image data or radar sensing data;
determining, by a processor communicatively connected to the at least one of the camera sensor or the radar sensor, based on the image data or radar sensing data, a first distance orthogonal to a route of the host vehicle and between a preceding vehicle running in a same direction as the host vehicle and a roadway center line apparent on a roadway surface; and
selectively controlling, by the processor, at least one of a braking controller or a steering controller of the host vehicle based on the result of the determined first distance.

18. The collision monitoring method of claim 17, further comprising, before the determining of the first distance, at least one of:
  capturing, by a camera sensor mounted to the host vehicle, images of areas around the host vehicle and generating image data; or
  sensing, by a radar sensor mounted to the host vehicle, the areas around the host vehicle and generating radar sensing data,
  wherein the determining the first distance comprises determining the first distance between the preceding vehicle and the roadway center line on the basis of at least one of the image data or the radar sensing data.

19. The collision monitoring method of claim 17, wherein the processor selectively activates the braking controller to apply brakes of the host vehicle in response to determining that the first distance is less than a predetermined second distance.

20. The collision monitoring method of claim 17, wherein the processor selectively activates the steering controller to steer the host vehicle through a center of a first space between the preceding vehicle and the roadway center line.

21. The collision monitoring method of claim 17, further comprising:
  determining a predicted route of the host vehicle through an intersection,
  wherein the first distance is determined based on the determined predicted route.

22. The collision monitoring method of claim 21, wherein the processor determines the predicted route of the host vehicle on the basis of a current lane of the host vehicle and a lane in which the host vehicle is to run after passing through the intersection.

* * * * *